United States Patent [19]

Tamamori

[11] Patent Number: 5,146,952
[45] Date of Patent: Sep. 15, 1992

[54] FLUID PRESSURE CONTROL VALVE DEVICE FOR A RAILWAY CAR

[75] Inventor: Hideo Tamamori, Kobe, Japan

[73] Assignee: Nippon Air Brake Co., Ltd., Kobe, Japan

[21] Appl. No.: 764,699

[22] Filed: Sep. 24, 1991

[30] Foreign Application Priority Data

Sep. 26, 1990 [JP] Japan .................. 2-101250[U]

[51] Int. Cl.⁵ .......................... F16K 31/126
[52] U.S. Cl. .................. 137/627.5; 303/22.5; 303/22.8; 303/81
[58] Field of Search ............ 137/116.3, 596.18, 627.5, 137/85; 303/91, 94, 22.5, 22.7, 22.8, 40

[56] References Cited

U.S. PATENT DOCUMENTS

| | | | |
|---|---|---|---|
| 3,228,731 | 1/1966 | Valentine | 303/22.5 X |
| 4,883,089 | 11/1989 | Tamamori | 137/627.5 X |
| 4,917,148 | 4/1990 | Tamamori | 137/627.5 X |

Primary Examiner—Robert G. Nilson
Attorney, Agent, or Firm—GJF

[57] ABSTRACT

A control valve device for a railway car having an arrangement for changing the axial position of a variable area piston in order to adjust the output pressure of a piston valve assembly in accordance with a high or low speed of the railway car. The axial position of a supply valve seat is set in accordance with a high or low speed signal to in turn set the axial posiiton at which the piston assembly, including the variable area piston, assumes a lap condition.

11 Claims, 3 Drawing Sheets

FLUID PRESSURE CONTROL VALVE DEVICE FOR A RAILWAY CAR

BACKGROUND OF THE INVENTION

This invention relates to pressure control valves and particularly to variable load type pressure control valves for railway cars in which a two-stage output gain characteristic is obtained.

In the case of braking railway cars, when brake force F (i.e., $F = P \times f$; where P is a pushing pressure of braking shoes, and f is a friction coefficient of brake shoes) exceeds the adhesive force between wheels and rails, the wheels come into a free running condition, commonly referred to as wheel slide. Therefore, the brake force of the cars, F, has been typically set at a value which will not exceed the aforementioned adhesion force, W even in a maximum braking condition, such as an emergency stop.

In general, the friction coefficient of brake shoes f tends to be higher than the adhesion coefficient in low speed operation, even though it is sufficiently lower than the adhesion coefficient in high speed operation. Because of this tendency, the brake force F in maximum braking is normally set at a value which will not exceed the adhesion force W during low speed operation, in order to prevent wheel slide. This results in a problem in which the braking force in high speed operation is substantially less than that which can be supported by the available wheel to rail adhesion. This problem must be addressed, since more powerful brakes are being employed with the development of higher speed cars.

This suggested the possibility of increasing the brake air pressure when train speed increased above a certain speed, in order to increase braking force during high speed operation. One possible solution is to install an extra pressure increase piston into a variable load valve for rail cars which is described in Japanese Patent 62-201557. Such an arrangement is shown in FIG. 3. This variable load valve arrangement of FIG. 3 comprises an air supply chamber 2 connected to a source of compressed air through air supply passage 1; an output chamber 4 connected to an output passage 3; an exhaust chamber 5 opened to atmosphere; a valve seat 7 installed in air supply hole 6 that interconnects the air supply chamber 2 and the output chamber 4; an air supply valve 9 with which a valve spring 8 acts to engage the supply valve with the valve seat 7; an exhaust valve rod 11 inserted in the air supply hole 6 with the front end facing the air supply valve 9 and constituting one open end of a central passage 10, the other end of which opens into the exhaust chamber 5; a control piston 15 including a diaphragm 13 having its outer peripheral edge fixed to the inside of the valve body 12 and its inner periphery fixed to a control piston body 14, a control piston 15 providing the command force that moves the exhaust valve rod 11 in the direction of the air supply valve 9 in response to a command air pressure; a balancing piston 18 which generates a balancing force against the aforementioned command force by receiving the air pressure from the output chamber 4, the balancing piston 18 including a diaphragm 16 having its outer peripheral edge fixed inside the valve body 12 and its inner periphery fixed to the perimeter of the balancing piston 17, an intermediate body 19 having the aforementioned air supply chamber 2, air supply hole 6, valve seat 7, and the air supply valve 9; a position control device 20, which can either move the intermediate body 19 in an axial direction toward the exhaust valve rod 11 or fix it axially in an arbitrary position, a first multiplication member having plural fins 21 that project radially from balancing piston 18 to support diaphragm 16 on one side of the plural fins around the perimeter of the piston body against the aforementioned air pressure effective in output chamber 4, the other side of fin 21 being engageable with control piston 14; a second multiplication member having fins 22 projecting radially from body 12 and arranged within the interstices of the first finned member, the diaphragm supporting surface of the respective fins 21 and 22 being tapered in opposite directions; a first spring 24 supported between a first spring seat 23 that projects through the center of the control piston 15 at one end and by the balancing piston 18 at the other end; a second spring 26 supported by the control piston 15 via a second spring seat 25 at one end and by the balancing piston 18 at the other end; a first spring adjusting mechanism 27 installed between the first spring seat 23 and a threaded portion of the valve body 12 in order to adjust the force of the first spring; a second spring adjusting mechanism 28 installed between the second spring seat 25 and the control piston 15 to adjust the force of the second spring 26.

A pressure increase unit is provided for this variable load valve, as shown in the lower part of the device, comprising a pressure increase piston 31, which applies a pressure increase command force to the aforementioned control piston 15, in response to the supply of command air pressure. Pressure increase piston 31 is formed by a piston body 30 and a diaphragm that is fixed at its outer periphery to valve body 12 and at its inner periphery to piston body 30. In accordance with this arrangement of the pressure increase piston 31, the components of the first spring adjusting mechanism 27 and the second spring adjusting mechanism 28 come to pass through the pressure increase piston body 30. That is to say that the rod for externally operating the positions of the first spring seat 23 and the second spring seat 25 extends through the body 30 downward in the figure. Because of this, O-ring seals 33, 34, and 36 are installed in the places where the rod 32 passes through the control piston body 14, the pressure increase piston body 30, and the valve body 12, respectively.

A variable load valve arranged with the pressure increase piston 31 thus uses the air spring pressure of a railway car as a command air pressure, and operates in the following manner. Since the air spring pressure changes with the car body weight due to loading or unloading of passengers and cargoes, the control piston 15 receives pressure depending on the weight of the car body. The command force caused by the air spring pressure on the control piston 15 is transmitted to the balancing piston 18, and thus to exhaust valve rod 11 to engage and open the air supply valve 9. When the air supply valve opens, the air from the pressure source is supplied to output chamber 4 via air supply chamber 2 and air supply hole 6. When the brake cylinder pressure increases, the pressure of output chamber 4 acting on balancing piston 18 also increases and thus generates the balancing force against the command force of the balancing piston 18. When the balancing force and the command force balance each other, the air supply valve 9 engages valve seat 7 as shown in the figure, while the front end of the exhaust valve rod 11 remains engaged with the air supply valve 9 to achieve a lap condition in which no supply or exhaust of brake cylinder pressure occurs. Therefore, the appropriate output air pressure is obtained in response to a change of the air spring pressure.

The above is a brief explanation of the basic operation of a variable load valve of the type with which the present invention is concerned. It will be noted that, in addition, the effective area ratio of the balancing piston 18 and the control piston 15 can be changed by the structural arrangement related to the intermediate body 19, its position control mechanism 20, the first and second fins 21 and 22, and the diaphragm members 13 and 16. That is to say that the position of the intermediate body 19 can be changed in the upward and downward direction of the figure by rotating the position adjusting mechanism 20. When the position of the intermediate body 19 changes, the axial position at which the aforementioned lap condition occurs also changes, the corresponding position of the balancing piston 18 changes, and finally, the balancing piston effective pressure area changes, since the active area of the balancing piston diaphragm member 16 that is supported by the first fin 21 changes. Because of this, the effective area ratio between the control piston 15 and the balancing piston 18 also changes. The fact that this effective area ratio is changeable, is especially advantageous, since this allows the output air pressure to change in response to a certain command air pressure without having to change the control piston or balancing piston to other different sizes of pistons.

In addition, a desired minimum output air pressure and empty car air spring pressure can be set because of the first spring 24, the second spring 16 and their adjustment control mechanisms 27 and 28, respectively. That is to say that the first spring 24 acts on the balancing piston 18, and this spring force is counteracted by the force of output pressure acting on balancing piston 18. If we suppose that the air spring pressure (command air pressure) is zero, an output air pressure is obtained in response to which the balancing piston 18 acts to balance against the force from the first spring 24. Since the force of the first spring 24 is adjustable by the first spring adjusting mechanism 27, the output air pressure does not become lower than the minimum air pressure as long as the output air pressure is adjusted to the level of the minimum air pressure that is sufficient for the brake cylinder to function when the air spring pressure is zero. That means that the minimum output air pressure can be set by adjusting the first spring 24.

The second spring 26 operates in such a way that it tends to force the balancing piston 18 and the control piston 15 apart. When the spring operating force is small, the second spring is essentially non-existent since the balancing piston 18 and the control piston 15 are engaged with each other, and the command force is transmitted directly to the balancing piston 18, due to the spring compression, even when the air spring pressure (command air pressure) is low. However, if the force of the second spring 26 mentioned above is large, the control piston 15 is disengaged from balancing piston 18, when the air spring pressure is low, and the force of the second spring 26 exerts a counteracting force on the balancing piston 18, causing the situation in which this counteracting force works against the output air pressure on the balancing piston 18. Since the force of the second spring 26 can be adjusted by the second spring adjusting mechanism 28, the output air pressure does not change, due to the absence of position change in the control piston 15, until the air spring pressure exceeds the empty car air spring pressure, by adjusting the force of the second spring 26 in such a way that the control piston 15 is disengaged from balancing piston 18 when the air spring pressure exceeds the empty car air spring pressure. That means that the empty car air spring pressure can be set by adjusting the second spring 26.

By means of the pressure increase piston 31, a pressure increase command is output only during the period the cars run above a certain speed. When pressure is supplied from the car air springs to piston 31, a pressure increase command force is added to the control piston 15 causing it to need a greater balancing force of the balancing piston 18. Therefore, the output air pressure increases. Because of such an arrangement, a larger brake force is achieved in a high speed running condition than in a low speed running condition when brakes are used for running cars.

The conventional variable load valve, explained by FIG. 3 has a fixed pressure amplification ratio depending on the effective pressure area of diaphragm 29 of the pressure increase piston 31. Therefore, there exists a problem in that there needs to be available several pressure increase pistons 31 with different effective pressure areas in cases where another pressure amplification ratio is desired. Furthermore, there is another problem in that the response sensitivity of the output air pressure in response to the command air pressure becomes much worse during high speed running, since the dynamic resistance of the control piston 15 and the pressure increase piston 31 in a pressure increase condition becomes those of not only O-ring seal 33, but also of O-ring seals 34 and 36, whereas, in a condition when there is no pressure increase, as during low speed running, the dynamic resistance is that of only O-ring seal 33. There is also the additional problem that the variable load valve device becomes large because of the large diaphragm size making it necessary to install the pressure increase piston 31, which in turn enlarges the height of the variable load valve device.

SUMMARY OF THE INVENTION

It is an object of the present invention to provide a two-stage output gain characteristic in a railway variable load valve device without affecting the normal response time.

It is a further object of the invention to provide a variable load valve device in accordance with the foregoing wherein the output gain characteristic is selectively adjustable without requiring any disassembly and replacement of parts.

It is an extension of the above objects to provide the two-stage output gain characteristic in accordance with the car running speed being less than or greater than a predetermined value under all conditions of vehicle loading.

It is a final object of the invention to provide a variable load valve device in accordance with the foregoing that is compact in size, reliable in operation, and less costly to manufacture.

The current invention achieves the function of the pressure increase piston in the variable load valve explained in FIG. 3, by utilizing a modified intermediate body position adjusting mechanism 20, which moves the intermediate body position an arbitrarily set fixed amount from the adjusting position set by a conventional intermediate body position adjusting mechanism in order to achieve an increased output air pressure.

This invention comprises the variable load valve with the pressure increase piston unit removed from the aforementioned variable load valve, or the variable load valve without the pressure increase piston unit, the first and second springs, and its control mechanism. Instead, this invention has installed a pressure increase assembly which moves the aforementioned intermediate body back and forth relative to the aforementioned exhaust valve rod by supplying pressurized air during high speeds to a pressure area of the intermediate body 19, and has the characteristics of incorporating a stopper mechanism, which regulates the forward and backward movement of the intermediate body within a certain range.

These and other objects and advantages of the invention will become apparent from the following more detailed explanation when taken in conjunction with the accompanying drawings in which.

OPERATION OF THE INVENTION

This pressure control valve can obtain a pressure amplification effect for the output pressure in a high speed running condition while retaining the aforementioned variable valve effect, the command air pressure/the changing mechanism of the output air pressure characteristic, or, in addition, the minimum output air pressure adjusting mechanism, and the empty car air spring pressure adjusting mechanism. That is to say that the intermediate body is in a position set by the intermediate body position adjusting mechanism prior to air pressure being supplied to the pressure area of the intermediate body, and outputs the output air pressure in response to the command air pressure. This output air pressure increases with an amount corresponding to the decrease of the effective area of the balancing piston when the intermediate body changes its position by moving forward for the distance set by the stopper subsequent to air pressure being supplied to the pressure area of the intermediate body.

Figure 1:
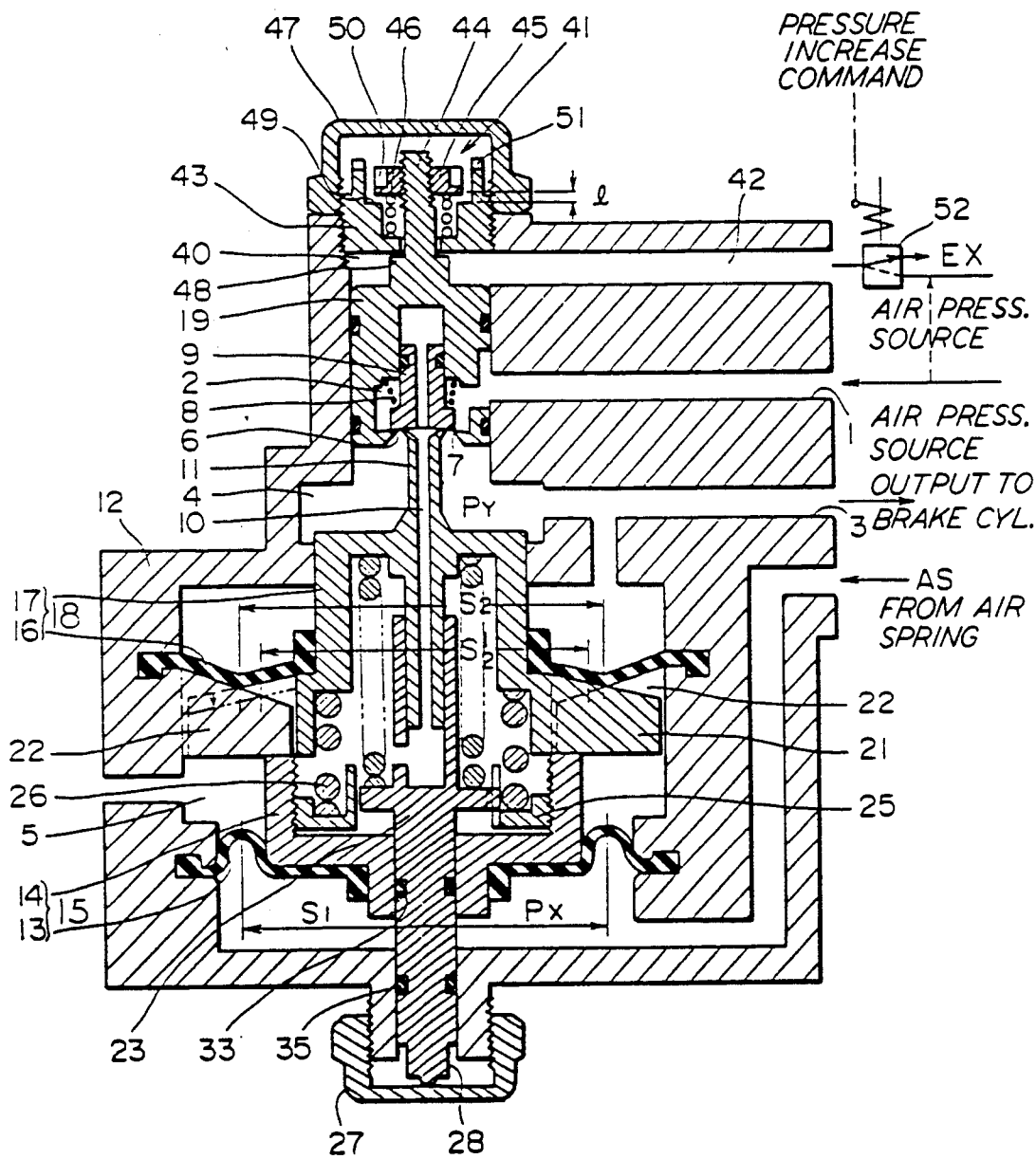
FIG. 1 is a sectional assembly view of a variable load valve device in accordance with the present invention.
Figure 3:
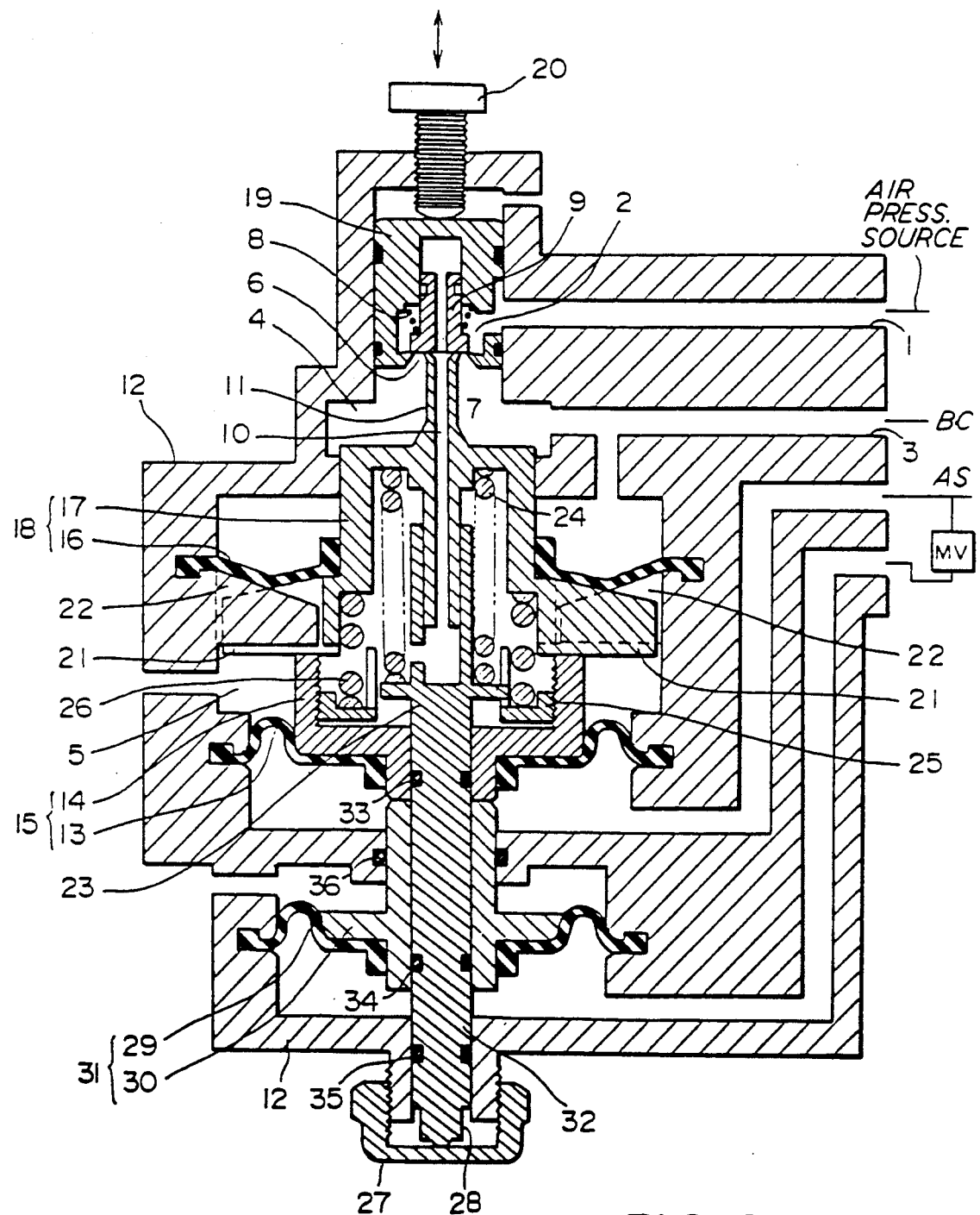
FIG. 3 is a sectional assembly view of a conventional variable load valve device with which the present invention may be employed.

One application example of the current invention is explained below referring to FIG. 1. This application example eliminates the parts of the pressure increase piston 31 in the lower part of the variable load valve in FIG. 3, has the modified position adjusting mechanism for the intermediate body, and has added the pressure increase unit in high speed running conditions. The pressure increase unit in high speed running conditions is explained below. The explanation of the same parts illustrated in FIG. 3 will be omitted, though the same codes and names have been used in the figure.

The pressure increase unit during high speed running is comprised of the pressure increase chamber 40 and the intermediate body supporting unit 41. The pressure increase chamber 40 is placed in the rear part of the intermediate body 19, i.e., at the opposite side of the exhaust valve rod 11, and connects to a pressure increase command passage 42. The intermediate body supporting unit 41 is comprised of a positioning member 43 that is screw-threaded to the valve body 12, at a location in the extended part of the pressure increase chamber 40 situated adjacent the rear part of the intermediate body. A stem 44 of intermediate body 19 projects through an opening in the positioning member 43 for free axial movement. Intermediate body supporting unit 41 further comprises a stop 45 in the form of a nut that is screw-threaded on the end of stem 44, a spring 46 pressed between that stop 45 and the positioning member 43, and an air-tight cover 47. The stem 44 has a shoulder 48 (which is adjacent the front end of the positioning member 43) with which the intermediate body 19 is engageable to establish its axial position. The positioning member 43 has an inturned flange 49 which the stop 45 abuts when the intermediate body 19 moves against the spring 46. In the figure, 50 is the rotation control mechanism of the stop 45, and 51 is the rotation control mechanism of the position determining unit.

The variable load valve in such an arrangement with a pressure increase unit is conditioned during high speed running by connecting the pressure increase command passage 42 to the source of pressure (pressure sufficiently higher than the output air pressure), as illustrated in the figure, through a pressure increase valve 52 operated by an electromagnetic solenoid. The pressure increase valve 52 switches the connection of the pressure increase command passage from an exhaust connection to the source of air pressure by the pressure increase command, and switches back to the exhaust connection again when the pressure increase command is no longer present. In the condition in which the pressure increase valve 52 connects the pressure increase command passage 42 to the exhaust connection (i.e., condition in which there is no pressure increase command) and the axial position of the intermediate body 19 is established by reason of shoulder 48 engaging the front surface of the positioning member 43. This position can be changed by rotating the positioning member 43 with the rotation control mechanism 51, and this rotation control mechanism 51 corresponds to the conventional position determining mechanism 20 in the arrangement of FIG. 3, for the intermediate body. In a condition in which the pressure increase command is absent, the variable load valve functions the same as the conventional variable load valve.

Once the pressure increase command is given to the pressure increase valve 52, in accordance with high speed running, air pressure is introduced into the pressure increase chamber 40, and, therefore, the intermediate body moves forward by receiving the pressure signal on the pressure area from which stem 44 projects. The distance l of that intermediate body is regulated by the position of the stop 45, which is capable of changing its axial position by rotation of the adjusting nut on the threaded stem 44. Therefore, the intermediate body 19 is positioned at a distance l which is controlled by the adjusted setting of the stop 45, and an output pressure corresponding to that position is realized. Since the lap position moves downward in the figure as the intermediate body 19 moves forward, the effective area of the balancing piston 18 decreases from $S_2$ to $S_2'$, and the output air pressure $P_Y$ changes from $$P_Y = (S_1/S_2) \times P_x$$

to $$P_Y = (S_1/S_2') \times P_x$$

when the command air pressure $P_x$ is acting on the effective area $S_1$ of the control piston 15. That means that the output air pressure $P_Y$ increases an amount proportional to the increase of the effective area ratio $S_1/S_2'$ due to the decrease of the effective area of balancing piston 18 from $S_2$ to $S_2'$. Since the change of this effective area ratio is made by the axial position change of the intermediate body, the response characteristic does not change whether or not the pressure increase is present.

Therefore, not only does the output air pressure become high by the pressure increase command during high speed running above the certain speed, but the brake force can be applied to wheels with a good response characteristic.

Figure 2:
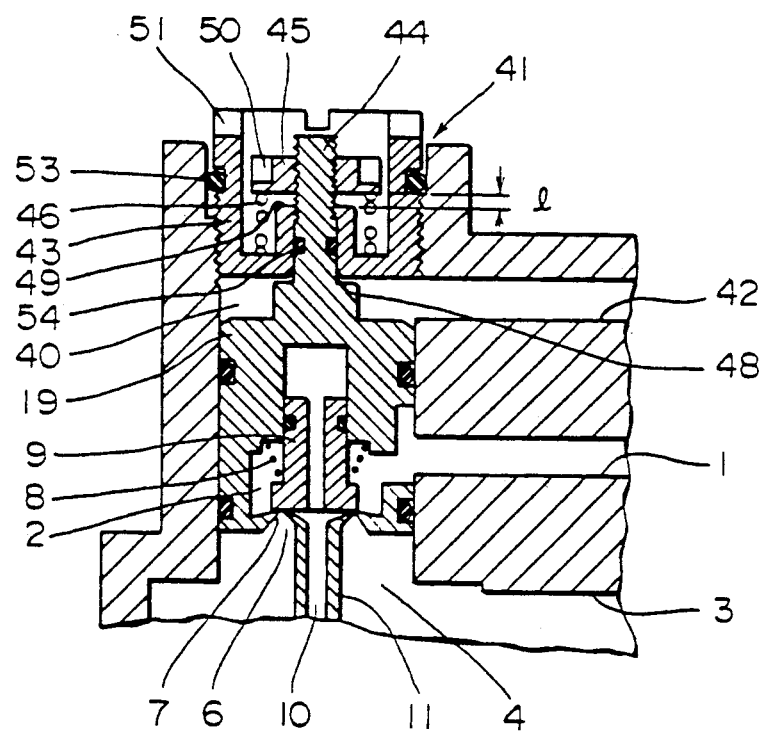
FIG. 2 is a fragmentary sectional assembly view of a variable load valve device embodying a modification of the arrangement of FIG. 1.

FIG. 2 shows a modified version of the application example described above. This example employs an O-ring seal 53 between the position determining unit 43 and the valve body 12 and an O-ring seal 54 between the projecting stem 44 and the position determining unit 43 in order to eliminate the cover 47. The rest of the figure is the same as the application example of FIG. 1, and the same parts are indicated by the same reference numerals and nomenclature, so that no further explanation is necessary.

Although the above-discussed examples were explained in relation to a variable load valve which provides brake pressure corresponding to the pressure supplied to the control piston 15 by the car air spring, it can be employed as a control valve having a pressure increase function in response to another command air pressure that may be applied to the control piston 15. For example, this can be applied to a relay valve or a three-pressure control valve.

I claim:

1. A fluid pressure control valve device comprising:
  (a) a supply passage to which a source of fluid under pressure is connected;
  (b) an output passage to which a fluid pressure operating cylinder is connected;
  (c) an exhaust passage connected to atmosphere;
  (d) a valve member;
  (e) a supply valve seat between said supply passage and said output passage with which said valve member coacts to control the supply of fluid under pressure to said operating cylinder;
  (f) means for urging said valve member toward engagement with said supply valve seat;
  (g) an exhaust valve seat between said output passage and said exhaust passage with which said valve member coacts to control the exhaust of fluid under pressure from said operating cylinder;
  (h) a balancing chamber to which said output passage is connected;
  (i) a first piston member in said balancing chamber having said exhaust valve seat, said first piston member being displaced in a first axial direction to effect disengagement of said exhaust valve seat from said valve member in response to fluid pressure effective in said balancing chamber acting on one side of said first piston member;
  (j) means acting on said first piston member on the side thereof opposite said one side for urging axial movement of said first piston member in a second axial direction to effect engagement of said exhaust valve seat with said valve member and to effect disengagement of said valve member from said supply valve seat;
  (k) said first piston member having a lap position in which said valve member is engaged with said supply valve seat and said exhaust valve seat, said first piston member further comprising:
    (i) a piston body;
    (ii) an annular diaphragm member having an inner periphery fixed to said piston body and an outer periphery fixed to the body of said control valve device; and
    (iii) a first plurality of fins projecting radially from said piston body and having a first support surface with which said diaphragm member is removably engaged;
  (l) a second plurality of fins projecting radially from the body of said control valve device into the spaces between said second fins and having a second support surface with which said diaphragm member is removably engaged, said first and second support surfaces being tapered in opposite directions such that the effective pressure area of said first piston member subject to the fluid pressure effective in said balancing chamber varies as the axial position of said first piston member changes;
  (m) a second piston member having first and second axially spaced stops and further including said supply valve seat, said second piston member being axially movable from a first position to a second position; and
  (n) a positioning member connected to the body of said control valve device and interposed between said first and second stops for engagement therewith to limit said axial movement of said second piston member in said first and second axial directions to establish said first and second positions thereof and accordingly vary the effective pressure area of said first piston member in said lap position thereof.

2. A control valve device as recited in claim 1, further characterized in that said supply valve seat is formed integral with said second piston member.

3. A control valve device as recited in claim 1, wherein said means acting on said first piston member comprises a third piston member, pressurization of said third piston member urging movement thereof in a direction corresponding to said second direction of movement of said first piston member.

4. A control valve device as recited in claim 3, wherein said third piston member is engageable with said first piston member to provide a control force on said first piston member against which the force of fluid pressure effective in said balancing chamber acts in accordance with the effective pressure area of said first piston member.

5. A control valve device as recited in claim 3, further comprising means for effecting said pressurization of said third piston member so as to vary with the load weight of a vehicle.

6. A control valve device as recited in claim 1, wherein at least one of said first and second stops is axially adjustable relative to said second piston member.

7. A control valve device as recited in claim 6, wherein said first stop is axially adjustable relative to said second piston member and said second stop is fixed relative thereto.

8. A control valve device as recited in claim 7, wherein said positioning member is connected to the body of said control valve device via screw threads such that rotation of said positioning member adjusts said positioning member axially to accordingly establish said first position of said second piston member.

9. A control valve device as recited in claim 8, wherein said positioning member is formed with an opening therethrough, said second piston member comprising:
   (a) a pressure area on the side opposite said supply valve seat;
   (b) a stem projecting from said pressure area through said opening in said positioning member, said stem having screw threads; and
   (c) a stop nut threadedly connected to said stem and engagable with said positioning member to provide said first stop and thereby limit said axial movement of said second piston member from said first position to said second position.

10. A control valve device as recited in claim 9, further comprising spring means between said stop nut and said positioning member for urging said second piston member in a direction to establish engagement of said valve member with said supply valve seat.

11. A fluid pressure control valve device comprising:
   (a) a supply passage to which a source of fluid under pressure is connected;
   (b) an output passage to which a fluid pressure operating cylinder is connected;
   (c) an exhaust passage connected to atmosphere;
   (d) a valve member;
   (e) a supply valve seat between said supply passage and said output passage with which said valve member coacts to control the supply of fluid under pressure to said operating cylinder;
   (f) means for urging said valve member toward engagement with said supply valve seat;
   (g) an exhaust valve seat between said output passage and said exhaust passage with which said valve member coacts to control the exhaust of fluid under pressure from said operating cylinder;
   (h) a balancing chamber to which said output passage is connected;
   (i) a first piston member in said balancing chamber having said exhaust valve seat, said first piston member being displaced in a first axial direction to effect disengagement of said exhaust valve seat from said valve member in response to fluid pressure effective in said balancing chamber acting on one side of said first piston member;
   (j) means acting on said first piston member on the side thereof opposite said one side for urging axial movement of said first piston member in a second axial direction to effect engagement of said exhaust valve seat with said valve member and to effect disengagement of said valve member from said supply valve seat;
   (k) said first piston member having a lap position in which said valve member is engaged with said supply valve seat and said exhaust valve seat, said first piston member further comprising:
      (i) a piston body;
      (ii) an annular diaphragm member having an inner periphery fixed to said piston body and an outer periphery fixed to the body of said control valve device; and
      (iii) a first plurality of fins projecting radially from said piston body and having a first support surface with which said diaphragm member is removably engaged;
   (l) a second plurality of fins projecting radially from the body of said control valve device into the spaces between said second fins and having a second support surface with which said diaphragm member is removably engaged, said first and second support surfaces being tapered in opposite directions such that the effective pressure area of said first piston member subject to the fluid pressure effective in said balancing chamber varies as the axial position of said first piston member changes;
   (m) a second piston member including said supply valve seat, pressurization of said second piston member effecting axial movement of said supply valve seat from a first position to a second position, thereby axially shifting said lap position of said first piston member and accordingly changing the effective pressure area thereof; and
   (n) means for effecting said pressurization of said second piston member in response to a vehicle exceeding a predetermined speed.

* * * * *